(12) United States Patent
Baehrle-Miller et al.

(10) Patent No.: US 10,604,132 B2
(45) Date of Patent: Mar. 31, 2020

(54) METHOD FOR DETERMINING THE ACTUATION DISTANCE IN AN ELECTROMECHANICAL BRAKE DEVICE

(71) Applicant: Robert Bosch GmbH, Stuttgart (DE)

(72) Inventors: Frank Baehrle-Miller, Schoenaich (DE); Andreas Englert, Untergruppenbach (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 52 days.

(21) Appl. No.: 15/738,604

(22) PCT Filed: Apr. 26, 2016

(86) PCT No.: PCT/EP2016/059238
§ 371 (c)(1),
(2) Date: Dec. 21, 2017

(87) PCT Pub. No.: WO2016/206832
PCT Pub. Date: Dec. 29, 2016

(65) Prior Publication Data
US 2018/0194338 A1    Jul. 12, 2018

(30) Foreign Application Priority Data

Jun. 22, 2015  (DE) .................. 10 2015 211 468

(51) Int. Cl.
*B60T 13/74*         (2006.01)
*F16D 55/226*        (2006.01)
(Continued)

(52) U.S. Cl.
CPC .......... *B60T 13/741* (2013.01); *F16D 55/226* (2013.01); *F16D 65/183* (2013.01); *F16D 2066/003* (2013.01)

(58) Field of Classification Search
CPC ............................ B60T 13/741; F16D 55/226
(Continued)

(56) References Cited

U.S. PATENT DOCUMENTS

| 2015/0197224 A1* | 7/2015 | Hesseler | B60T 8/17 701/70 |
| 2015/0239439 A1* | 8/2015 | Sussek | B60T 8/171 701/70 |

(Continued)

FOREIGN PATENT DOCUMENTS

| CN | 103635366 A | 3/2014 |
| CN | 103661315 A | 3/2014 |

(Continued)

OTHER PUBLICATIONS

International Search Report corresponding to PCT Application No. PCT/EP2016/059238, dated Sep. 16, 2016 (German and English language document) (6 pages).

*Primary Examiner* — Thomas G Black
*Assistant Examiner* — Luat T Huynh
(74) *Attorney, Agent, or Firm* — Maginot, Moore & Beck LLP

(57) ABSTRACT

The disclosure relates to a method for determining the actuation distance in an electromechanical brake device having an electric brake motor, wherein the distance of a spindle nut is first determined while taking into account an initial value for the motor constant and the motor total resistance and a correction of the spindle nut distance is then performed after an estimation has been performed.

11 Claims, 2 Drawing Sheets

(51) Int. Cl.
*F16D 65/18* (2006.01)
*F16D 66/00* (2006.01)

(58) Field of Classification Search
USPC .......................................................... 701/70
See application file for complete search history.

(56) References Cited

U.S. PATENT DOCUMENTS

2015/0344014 A1* 12/2015 Knechtges .............. B60T 7/042
              701/70
2016/0377138 A1* 12/2016 Loens ..................... F16D 65/18
              188/106 F

FOREIGN PATENT DOCUMENTS

| | | |
|---|---|---|
| CN | 103863294 A | 6/2014 |
| CN | 103963758 A | 8/2014 |
| CN | 104136288 A | 11/2014 |
| DE | 10 2006 052 810 A1 | 5/2008 |
| DE | 10 2010 002 825 A1 | 9/2011 |
| DE | 10 2011 004 704 A1 | 8/2012 |
| DE | 10 2012 205 576 A1 | 10/2013 |
| DE | 10 2012 206 223 A1 | 10/2013 |

\* cited by examiner

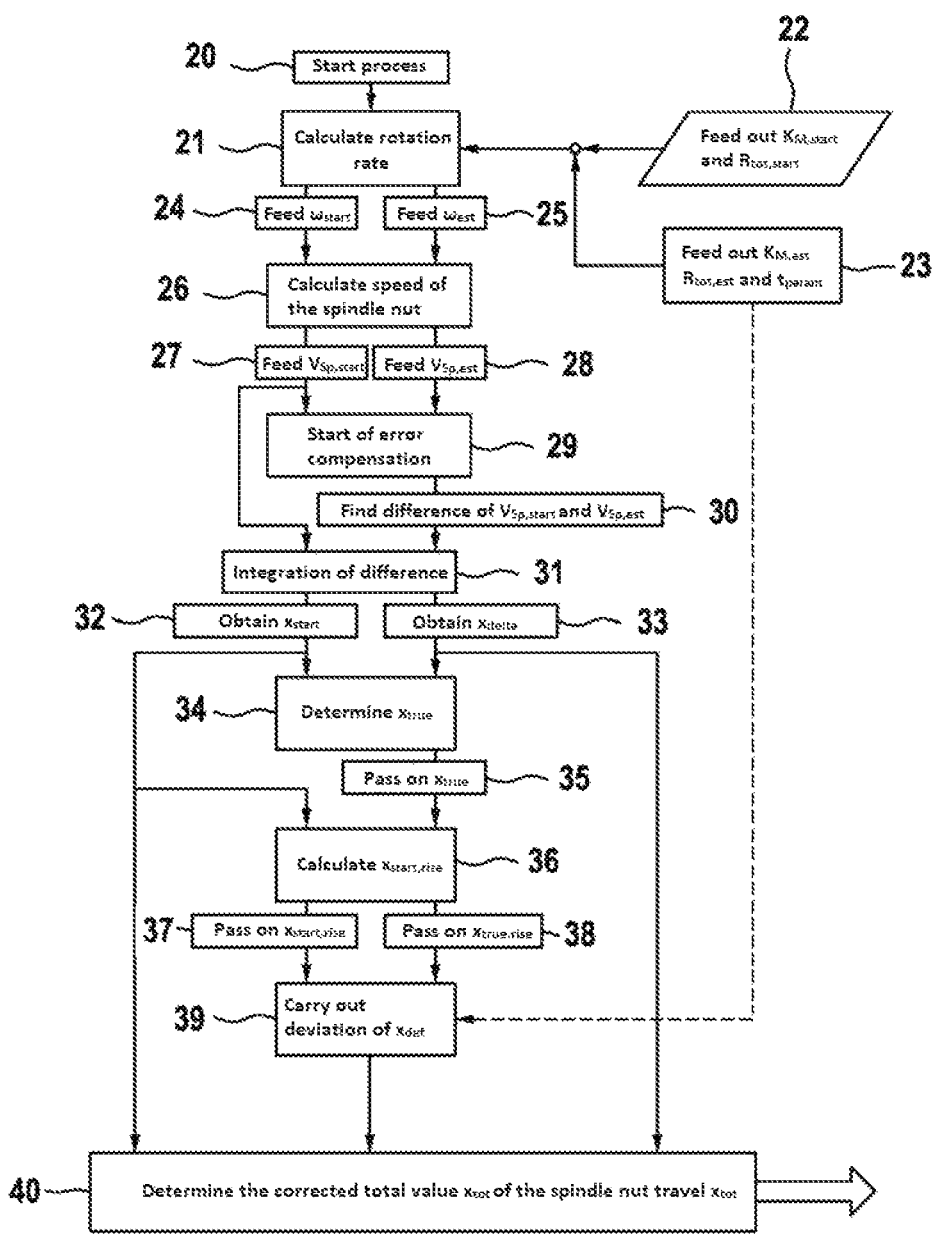

METHOD FOR DETERMINING THE ACTUATION DISTANCE IN AN ELECTROMECHANICAL BRAKE DEVICE

This application is a 35 U.S.C. § 371 National Stage Application of PCT/EP2016/059238, filed on Apr. 26, 2016, which claims the benefit of priority to Serial No. DE 10 2015 211 468.6, filed on Jun. 22, 2015 in Germany, the disclosures of which are incorporated herein by reference in their entirety.

The disclosure concerns a method for determining the actuation distance in an electromechanical brake mechanism in a vehicle.

BACKGROUND

Parking brakes or holding brakes are known, by means of which a clamping force holding the vehicle at a standstill is produced. The parking brake is implemented as an electromechanical brake mechanism with an electric brake motor, the motor shaft of which drives a spindle on which sits a spindle nut that is displaced towards a brake piston by the rotational movement of the spindle. The brake piston carries a brake lining and is applied to a brake disk during the drive movement of the brake motor. One such electromechanical brake mechanism is described in DE 10 2012 205 576 A1, for example.

For determining the clamping force, the motor constant of the electric brake motor must be known, the value of which can be subjected to manufacturing tolerances and moreover ageing-related and temperature-related fluctuations. According to DE 10 2012 205 576 A1, for determining the motor constant the voltage and the motor current are measured on the brake motor during a no-load phase, moreover the motor current is determined during a dynamic current change phase.

For building up the clamping force, first a no-load phase must be overcome, during which the spindle nut is displaced towards the disk brake owing to the drive movement of the brake motor, but there is still no contact between the brake lining and the brake disk.

SUMMARY

The method according to the disclosure is used for determining, and possibly also for adjusting, the actuation distance in an electromechanical brake mechanism with an electric brake motor in a vehicle. Using the method, it is for example possible to adjust the free travel (brake clearance), during which no braking or clamping force is exerted by the electromechanical brake mechanism, to a small extent or as a starting point of the spindle nut for a subsequent clamping process, whereby the time interval until building up the brake force during the clamping process is reduced. The actuation distance can be determined with high precision, so that for example brake drag with inadvertent contact between the brake lining and the brake disk is avoided. In general, the actuation distance in the brake mechanism can be determined both during a clamping process and during a releasing process, in each case in relation to the no-load phase and/or the force build-up or force reduction phase. The actuation distance concerns the actuation movement of the electric brake motor or a component driven by the brake motor, such as for example a spindle nut.

With the method, the motor shaft of the electric brake motor, which is part of the electromechanical brake mechanism, drives spindle on which a spindle nut sits. This is axially displaced by the rotational movement of the spindle towards a brake piston that is the carrier of a brake lining, which is pressed against the brake disk to generate the desired brake force. During a clamping process, free travel must be overcome by the electric brake motor, which refers to the travel of the spindle nut prior to the spindle nut contacting the brake piston. In order to reduce the free travel for example, the current spindle nut position must be known with high accuracy.

With the method according to the disclosure, the travel of the spindle nut is first determined while taking into account an initial value of the motor constant and an initial value of the total motor resistance (the sum of the individual resistances of the brake motor and lines to the brake motor). Then, after carrying out an estimation of the motor constant and the total motor resistance, a correction of the spindle nut travel is carried out while taking into account the estimated values for the motor constant and the total motor resistance. The spindle nut travel is thereupon related to a starting point, for example a retracted stop position.

Said procedure has the advantage that the current values for the motor constant and the total motor resistance are taken into account for the determination of the spindle nut travel. It is thus possible, for example, to detect temperature-related or ageing-related changes in said values and to improve said values compared to the initial values. Accordingly, the spindle nut travel has greater accuracy and the electric brake motor can be actuated so that the actuation distance of the spindle nut is set to a desired value, for example the free travel or the air gap of the spindle is reduced significantly until contact with the brake piston.

First, during the displacement of the spindle nut the spindle nut travel is determined using initial values for the motor constant and the total motor resistance. After the start of the spindle nut displacement, the motor constant and the total motor resistance are estimated, in particular based on the motor voltage and the motor current in the brake motor. After performing the estimation, a correction for the determined spindle nut travel is carried out with the current estimated values for the motor constant and the total motor resistance.

The determination of the spindle nut travel is carried out in the first step with initial values for the motor constant and the total motor resistance. The estimation is usually carried out within a short time interval after the start of the clamping process, for example about 0.2 seconds or 0.3 seconds. Once the estimated values for the motor constant and the total motor resistance are available, the correction can be carried out.

It is however also possible to carry out the correction at a fixed point in time, which preferably lies after the estimation of the motor constant and the total motor resistance, for example by 0.6 seconds.

According to an advantageous further embodiment, the determination of the spindle nut travel, including the correction, is carried out in different phases that are carried out successively in time, whereby different types of error are corrected in the different phases. A first type of error arises through the determination of the travel of the spindle nut based on non-current values for the motor constant and the total motor resistance if the estimated value for said parameters is not yet available. The non-current values for the motor constant and the total motor resistance originate either from pre-settings or from earlier estimations. A second type of error concerns the period of time after the existence of the estimated parameters for the motor constant and the total motor resistance if no correction is carried out. Using the method according to the disclosure, both types of error can be compensated.

According to an advantageous embodiment, the method for determining the actuation distance is carried out during a clamping process of the electromechanical brake mechanism, during which a clamping force or brake force is built up. However, it is also possible to carry out the method during a releasing process of the electromechanical brake mechanism, during which an existing brake force is reduced. In the latter case, it is advantageous that the spindle nut travel is only determined at the start of the no-load phase of the brake motor. The different steps of the method can either all be carried out only during a releasing process or only during a clamping process. It is however also possible to carry out one step of the method during a clamping process and a further step of the method during a releasing process.

The entire method is carried out in a regulating unit or a control unit in the vehicle. Said regulating unit or control unit can be part of the electromechanical brake mechanism and produces control signals for actuating the adjustable components of the brake mechanism.

BRIEF DESCRIPTION OF THE DRAWINGS

Further advantages and advantageous embodiments can be found in the description of the figures and the drawings. In the figures:

FIG. 3 shows a graph with the time-dependent profile of the spindle nut travel with and without a correction.

DETAILED DESCRIPTION

Figure 1:
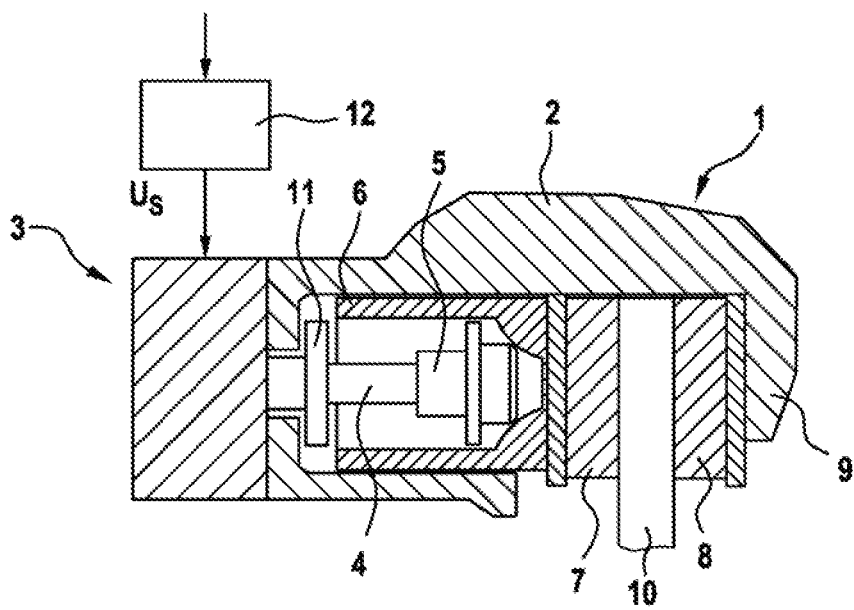
FIG. 1 shows a section through an electromechanical brake mechanism that can be used as a parking brake in a vehicle and with which the brake force or clamping force can be produced by means of an electric brake motor.

In FIG. 1, an electromechanical brake mechanism 1 for holding a vehicle at a standstill is represented. The brake mechanism 1 comprises a brake caliper 2 with a claw 9 that overlaps a brake disk 10. As a control element, the brake mechanism 1 comprises a d.c. electric motor as the brake motor 3, the motor shaft of which drives a spindle 4 in rotation, on which a spindle nut 5 is rotatably supported. During a rotation of the spindle 4, the spindle nut 5 is displaced axially. The spindle nut 5 moves within a brake piston that is the carrier of a brake lining 7 that is pressed against the brake disk 10 by the brake piston 6. On the opposite side of the brake disk 10 there is a further brake lining 8 that is held positionally fixedly on the claw 9.

Within the brake piston 6, the spindle nut 5 can move axially forwards towards the brake disk 10 during a rotational movement of the spindle 4 or axially rearwards until reaching a stop 11 during an opposite rotational movement of the spindle 4. To produce a clamping force, the spindle nut 5 acts on the inner end face of the brake piston 6, whereby the brake piston 6, which is axially movably supported in the brake mechanism 1, is pressed with the brake lining 7 against the facing end surface of the brake disk 10.

The brake motor 3 is actuated by a regulating unit or control unit 12 that is part of the brake mechanism 1. The regulating unit or control unit 12 provides as an output a supply voltage $U_S$, to which the electric brake motor 3 is subjected.

The parking brake can if necessary be assisted by a hydraulic vehicle brake, so that the clamping force is composed of an electromotive component and a hydraulic component. During hydraulic assistance, the rear side of the brake piston 6 facing the brake motor is subjected to hydraulic fluid under pressure.

Figure 2:
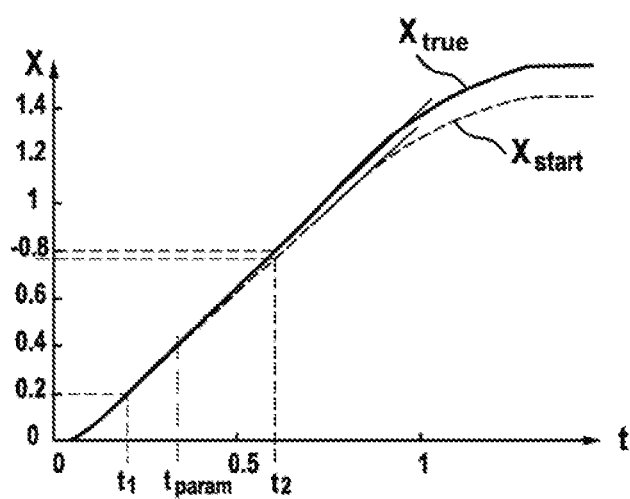
FIG. 2 shows a process diagram for determining the free travel in the electromechanical brake mechanism.

FIG. 2 shows the spindle nut travel x as a function of time at the start of a clamping process for building up braking force or clamping force. Two different graphs $x_{start}$ and $x_{true}$ are plotted, which are determined based on different parameters of the motor constant and the total motor resistance. The spindle nut travel $x_{start}$ represents the uncorrected travel of the spindle nut using non-current parameters of the motor constant and the total motor resistance. The spindle nut travel $x_{true}$ is on the other hand the corrected spindle nut travel, which is determined using current parameters for the motor constant and the total resistance. The point in time at which current estimated values of the motor constant exist that are determined from the supply voltage $U_S$ and the motor current $i_A$ when the engine is not loaded is denoted by $t_{param}$.

The spindle nut travel is in a constant rise in the no-load phase, which can be approximately represented as a straight line. In FIG. 2, two points in time $t_1$ and $t_2$ are plotted that lie within the linear rise of $x_{start}$ and $x_{true}$ and between which the point in time $t_{param}$ lies at which the estimation of the motor constant and the total motor resistance takes place.

In FIG. 3, a process diagram for determining the spindle nut travel with high accuracy is represented. This enables the actuation distance of the spindle nut to be determined, in particular the free travel of the spindle nut to be reduced, so that during a clamping process the time interval until building up a target brake force is reduced without the risk of brake drag existing.

In the step 20, the process for determining the spindle nut travel is started. The current motor current $i_A$ and the supply voltage $U_S$ are determined, from which the rotation rate $\omega$ of the motor shaft of the electric brake motor during no-load running can be calculated according to $$\omega(t) = (1/K_M) \cdot [U_{S(t)} - R_{tot} \cdot i_A(t)].$$

The rotation rate $\omega$ is a function of the motor constant $K_M$ and the total motor resistance said parameters are present either as non-current starting values $K_{M,start}$ and $R_{tot,start}$ or, after the point in time $t_{param}$, as current estimated values $K_{M,est}$ or $R_{tot,est}$. Depending on the current point in time, the motor constant and the total motor resistance are either fed out from a block 22 as non-current values or from a block 23 as current estimated values and are used in the block 21 for the calculation of the rotation rate, whereby accordingly the rotation rate $\omega_{start}$ and the estimated rotation rate $\omega_{est}$ are provided in the blocks 24 and 25.

The respective angular speed value is fed to a subsequent Block 26, in which the speed of the spindle nut $V_{Sp}$ is calculated. The calculation is carried out according to $$v_{Sp,start}(t) = \omega_{start}(t) \cdot S_{Sp}/(2 \cdot \Pi \cdot i_{trans})$$

$$v_{Sp,est}(t) = \omega_{est}(t) \cdot S_{Sp}/(2 \cdot \Pi \cdot i_{trans})$$

for the starting value $V_{Sp,start}$ of the speed of the spindle nut as a function of $\omega_{start}$ and for the estimated value $V_{Sp,est}$ as a function of the estimated rotation rate $\omega_{est}$. In this case, the spindle gradient $S_{Sp}$ and the transmission ratio $i_{trans}$ of a gearbox downstream of the brake motor are taken into account.

According to the blocks 27 and 28, the starting speed $V_{Sp,start}$ of the spindle nut and the estimated speed $V_{Sp,est}$ of the spindle nut are fed into a further step 29, which denotes the start of the error compensation. In the step 30, the difference of the starting speed and the estimated speed of the spindle nut is determined, and in the step 31 the integration of the speed difference against time is carried out according to $$x_{delta}(t)=\int[v_{Sp,start}(t)-v_{Sp,est}(t)]dt$$

From which a travel correction $x_{delta}$ is obtained. Together with $$x_{start}(t)=(1/K_{M,start}) \cdot S_{Sp}/(2 \cdot \Pi \cdot i_{trans})) \cdot \int[U_S(t)-R_{tot,start} \cdot i_A(t)]dt$$

the integration over time can be carried out in the step 31 from the spindle nut travel $x_{start}$, which is determined based on the non-current parameters $K_{M,start}$ and $R_{tot,start}$ of the motor constant and the total motor resistance. From this, in the steps 32 and 33 the spindle nut travel $x_{start}$ and the travel correction $x_{delta}$ are obtained, which result in the corrected spindle nut travel $x_{true}$ in the next step 34 according to $$x_{true}(t)=x_{start}(t)-x_{delta}(t).$$

The corrected spindle nut travel $x_{true}$ is passed on in the step 35 and is used in the subsequent step 36 according to $$x_{start,rise}=(x_{start}(t2)-x_{start}(t_1))/(t_2-t_1)$$

$$x_{true,rise}=(x_{true}(t2)-x_{true}(t_1))/(t_2-t_1)$$

for the calculation of the rise $x_{start,rise}$ of the spindle nut travel based on non-current parameters of the motor constant and the total motor resistance and for the rise $x_{true,rise}$ based on the current parameters of the motor constant and the total motor resistance. The rise values $x_{start,rise}$ and $x_{true,rise}$ correspond to the respective straight lines of FIG. 2 with which the respective graphs of $x_{true}$ and $x_{start}$ are approximated.

The values of and $x_{start,rise}$ and $x_{true,rise}$ are passed in the steps 37 and 38 to the subsequent step 39, in which a deviation $x_{def}$ is carried out according to $$x_{def}=(x_{start,rise}-x_{true,rise}) \cdot t_{param}$$

from the difference of $x_{start,rise}$ and $x_{true,rise}$ multiplied by the point in time $t_{param}$ at which the estimation of the motor constant and the total motor resistance is present. The time parameter $t_{param}$ is fed to the step 39 from the step 23.

In the next step 40, determining the corrected total value $x_{tot}$ of the spindle nut travel is carried out according to $$x_{tot}(t)=x_{true}(t)-x_{def}$$

by forming the difference of $x_{true}$ and $x_{def}$. The absolute position of the spindle nut relative to an initial value is thus determined, and the spindle nut position can be set in front of the brake piston with little play, so that when the brake motor is actuated only a minimal time elapses to build up brake force.

The invention claimed is:

1. A method for determining an actuation distance in an electromechanical brake mechanism in a vehicle, the electromechanical brake mechanism having an electric brake motor with a motor shaft that drives a spindle on which sits a spindle nut that is displaced towards a brake piston by a rotational movement of the spindle, the method comprising:
first determining a spindle nut travel ($x_{start}$) based on a motor constant initial value ($K_{M,start}$) and a total motor resistance initial value ($R_{tot,start}$);
estimating a motor constant estimated value ($K_{M,est}$) and a total motor resistance estimated value ($R_{tot,est}$); and
carrying out, after the estimating, a correction of the determined spindle nut travel based on the motor constant estimated value and the total motor resistance estimated value.

2. The method as claimed in claim 1, the determining of the spindle nut travel comprising:
determining the spindle nut travel based on a supply voltage ($U_S$) and a motor current ($i_A$) with the motor constant initial value and the total motor resistance initial value according to $$x_{start}(t)=(1/K_{M,start}) \cdot S_{Sp}/(2 \cdot \Pi \cdot i_{trans})) \cdot \int[U_S(t)-R_{tot,start} \cdot i_A(t)]dt$$

wherein:
$S_{Sp}$ denotes a spindle gradient;
$i_{trans}$ denotes a transmission ratio of a gearbox connected downstream of the electric brake motor;
$K_{M,start}$ denotes the motor constant initial value; and
$R_{tot,start}$ denotes the total motor resistance initial value.

3. The method as claimed in claim 2, the carrying out of the correction comprising:
determining a travel correction ($x_{data}$) determined from $$X_{delta}(t)=\int[v_{Sp,start}(t)-v_{Sp,est}(t)]dt, v_{Sp,start}(t)=\omega_{start}(t) \cdot S_{Sp}/(2 \cdot \Pi \cdot i_{trans}), \text{ and } v_{Sp,est}(t)=\omega_{est}(t) \cdot S_{Sp}/(2\Pi \cdot i_{trans}); \text{ and}$$

determining a corrected spindle nut travel ($x_{true}$) by subtracting the travel correction from the determined spindle nut travel,
wherein:
$V_{Sp,start}$ denotes a starting speed value of a speed of the spindle nut
$V_{Sp,est}$ denotes an estimated speed value of the speed of the spindle nut
$\omega_{start}$ denotes a rotation rate of the motor shaft
$\omega_{est}$ denotes an estimated rotation rate of the motor shaft
$i_{trans}$ denotes the transmission ratio of the gearbox connected downstream of the electric brake motor; and
$S_{Sp}$ denotes the spindle gradient.

4. The method as claimed in claim 3, further comprising:
determining a deviation ($x_{def}$) between a rise ($x_{start,rise}$) of the spindle nut travel with a non-current motor constant estimated value and the total motor resistance estimated value and a rise ($x_{true,rise}$) of the corrected spindle nut travel with a current motor constant estimated value and the total motor resistance estimated value according to $$x_{def}=(x_{start,rise}-x_{true,rise}) \cdot t_{param}, x_{start,rise}=(x_{start}(t_2)-x_{start}(t_1))/(t_2-t_1), \text{ and } x_{true,rise}=(x_{true}(t_2)-x_{true}(t_1))/(t_2-t_1),$$

wherein $t_{param}$ denotes a time interval until the current motor constant estimated value and the total motor resistance estimated value are available.

5. The method as claimed in claim 4, the carrying out of the correction comprising:
determining a corrected total travel of the spindle nut by subtracting the deviation from the corrected spindle nut travel.

6. The method as claimed in claim 1, the estimating further comprising:
using estimated values from one of a preceding clamping and releasing process of the electromechanical brake mechanism are used as the motor constant initial value and as the total motor resistance initial value.

7. The method as claimed in claim 1, wherein the method is carried out during a clamping process of the electromechanical brake mechanism.

8. The method as claimed in claim 1, wherein the method is carried out during a releasing process of the electromechanical brake mechanism.

9. The method as claimed in claim 8, further comprising: determining the spindle nut travel is only at a start of a no-load phase of the brake motor.

10. A regulating unit for determining an actuation distance in an electromechanical brake mechanism in a vehicle, the electromechanical brake mechanism having an electric brake motor with a motor shaft that drives a spindle on which sits a spindle nut that is displaced towards a brake piston by a rotational movement of the spindle, the regulating unit configured to:
   first determine a spindle nut travel based on a motor constant initial value and a total motor resistance initial value;
   estimate a motor constant estimated value and a total motor resistance estimated value; and
   carry out, after the estimation, a correction of the determined spindle nut travel based on the motor constant estimated value and the total motor resistance estimated value.

11. An electromechanical brake mechanism in a vehicle, the electromechanical mechanism comprising:
   an electric brake motor having a motor shaft that drives a spindle on which sits a spindle nut that is displaced towards a brake piston by a rotational movement of the spindle; and
   a regulating unit configured to:
      first determine a spindle nut travel based on a motor constant initial value and a total motor resistance initial value;
      estimate a motor constant estimated value and a total motor resistance estimated value; and
      carry out, after the estimation, a correction of the determined spindle nut travel based on the motor constant estimated value and the total motor resistance estimated value.

* * * * *

UNITED STATES PATENT AND TRADEMARK OFFICE
CERTIFICATE OF CORRECTION

PATENT NO. : 10,604,132 B2  
APPLICATION NO. : 15/738604  
DATED : March 31, 2020  
INVENTOR(S) : Frank Baehrle-Miller, Andreas Englert and Tobias Putzer Page 1 of 1

It is certified that error appears in the above-identified patent and that said Letters Patent is hereby corrected as shown below:

In the Claims

In Claim 2, at Column 6, Line 11, insert --(-- between the "=" and the "(".

In Claim 3, at Column 6, Line 22, delete the text "($x_{data}$)" and insert --($x_{delta}$)-- in its place.

In Claim 3, at Column 6, Line 25, delete the text "(2Π·$i_{trans}$)" and insert --(2·Π·$i_{trans}$)-- in its place.

In Claim 3, at Column 6, Line 31, insert --;-- after the word "nut".

In Claim 3, at Column 6, Line 33, insert --;-- after the word "nut".

In Claim 3, at Column 6, Line 34, insert --;-- after the word "shaft".

In Claim 3, at Column 6, Line 36, insert --;-- after the word "shaft".

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*